(12) United States Patent
Toda (10) Patent No.: US 7,466,817 B2
(45) Date of Patent: Dec. 16, 2008

(54) TONE GENERATOR DEVICE FOR DRIVING LIGHT EMITTING ELEMENTS

(75) Inventor: Hiroyuki Toda, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 143 days.

(21) Appl. No.: 10/971,974

(22) Filed: Oct. 21, 2004

(65) Prior Publication Data

US 2005/0089156 A1   Apr. 28, 2005

(30) Foreign Application Priority Data

Oct. 28, 2003 (JP) .............................. 2003-367531
Oct. 28, 2003 (JP) .............................. 2003-367532

(51) Int. Cl.
   *H04M 1/00* (2006.01)
(52) U.S. Cl. ...................................................... 379/361
(58) Field of Classification Search ................... 379/361
   See application file for complete search history.

(56) References Cited

U.S. PATENT DOCUMENTS

| | | | | | |
|---|---|---|---|---|---|
| 5,028,915 | A | * | 7/1991 | Yang ............................ | 345/82 |
| 6,134,200 | A | | 10/2000 | Timmermans | |
| 6,400,821 | B1 | * | 6/2002 | Burgan et al. ............... | 379/361 |
| 6,792,294 | B1 | * | 9/2004 | Kushita ....................... | 455/566 |
| 2002/0061772 | A1 | | 5/2002 | Hayashi | |
| 2004/0204125 | A1 | * | 10/2004 | Messel et al. ............... | 455/566 |

FOREIGN PATENT DOCUMENTS

| | | | |
|---|---|---|---|
| EP | 1255418 A2 | * | 6/2002 |
| EP | 1 222 971 | | 7/2002 |
| EP | 1 255 418 | | 11/2002 |
| EP | 1255418 | | 11/2002 |
| EP | 1318501 | | 6/2003 |
| EP | 1324578 | | 7/2003 |
| GB | 2361798 | | 11/2000 |
| GB | 2 361 798 | | 10/2001 |
| GB | 2361798 A | * | 10/2001 |
| GB | 2 380 908 | | 8/2003 |
| GB | 2 371 720 | | 10/2003 |
| JP | 10-126827 | | 5/1998 |
| JP | 2001-157254 | | 6/2001 |
| JP | 2001-211237 | | 8/2001 |
| JP | 2001-308972 | | 11/2001 |
| JP | 2002-141974 | | 5/2002 |

(Continued)

*Primary Examiner*—Ramnandan Singh
(74) *Attorney, Agent, or Firm*—Morrison & Foerster LLP (57) ABSTRACT

Tone generating sequence data are sequentially read out in accordance with a performance sequence, and tone generation control parameters are decoded from the read-out sequence data. The decoded tone generation control parameters are sequentially written into a control register. Tone signals are generated on the basis of the tone generation control parameters written in the control register. Pattern register stores pattern data representative of a time series of driven states to be taken by a plurality of light emitting elements. On the basis of the tone generation control parameters written in the control register, the pattern data stored in the pattern register are sequentially output to illuminate the light emitting elements. Particular pattern data may be stored in association with a particular caller so that, when an incoming call has been received from the particular caller, the pattern data specific to the particular caller are read out to illuminate the light emitting elements.

11 Claims, 7 DrawingSheets

FOREIGN PATENT DOCUMENTS

| | | |
|---|---|---|
| JP | 2002-300267 | 10/2002 |
| KR | 2002-0014945 | 2/2002 |
| RU | 2073913 | 2/1997 |
| WO | WO-01/97491 | 12/2001 |
| WO | WO-03/077505 | 9/2003 |
| WO | WO 03077506 A2 * | 9/2003 |

* cited by examiner

EXAMPLES OF LIGHT EMISSION SEQUENCE PATTERNS PT

| | | | | | | | | |
|---|---|---|---|---|---|---|---|---|
| PATTERN 1 | 1 | 0 | 0 | 0 | 1 | 0 | 0 | 0 |
| | 0 | 1 | 0 | 1 | 0 | 1 | 0 | 1 |
| | 0 | 0 | 1 | 0 | 0 | 0 | 1 | 0 |
| PATTERN 2 | 1 | 0 | 0 | 1 | 0 | 0 | 1 | 0 |
| | 0 | 1 | 0 | 0 | 1 | 0 | 0 | 1 |
| | 0 | 0 | 1 | 0 | 0 | 1 | 0 | 0 |
| 7 | ⋮ | | | | ⋮ | | | |
| PATTERN N | 1 | 1 | 0 | 0 | 0 | 0 | 0 | 0 |
| | 0 | 0 | 1 | 1 | 0 | 0 | 1 | 1 |
| | 0 | 0 | 0 | 0 | 1 | 1 | 0 | 0 |

EXAMPLES OF LIGHT EMISSION SEQUENCE PATTERNS PT

PTa:

| PATTERN 1 | 1 | 0 | 0 | 0 | 1 | 0 | 0 | 0 |
|---|---|---|---|---|---|---|---|---|
| | 0 | 1 | 0 | 1 | 0 | 1 | 0 | 1 |
| | 0 | 0 | 1 | 0 | 0 | 0 | 1 | 0 |
| PATTERN 2 | 1 | 0 | 0 | 1 | 0 | 0 | 1 | 0 |
| | 0 | 1 | 0 | 0 | 1 | 0 | 0 | 1 |
| | 0 | 0 | 1 | 0 | 0 | 1 | 0 | 0 |
| ⋮ | ⋮ | | | | | | | |
| PATTERN N | 1 | 1 | 0 | 0 | 0 | 0 | 0 | 0 |
| | 0 | 0 | 1 | 1 | 0 | 0 | 1 | 1 |
| | 0 | 0 | 0 | 0 | 1 | 1 | 0 | 0 |

PTb (CALLER-NO.-SPECIFIC PATTERN):

| No=xxxxx | 1 | 0 | 0 | 0 | 1 | 0 | 0 | 0 |
|---|---|---|---|---|---|---|---|---|
| | 0 | 1 | 0 | 1 | 0 | 1 | 0 | 1 |
| | 0 | 0 | 1 | 0 | 0 | 0 | 1 | 0 |
| No=xxxxx | 1 | 0 | 1 | 0 | 1 | 0 | 1 | 0 |
| | 1 | 0 | 1 | 0 | 1 | 0 | 1 | 0 |
| | 1 | 0 | 1 | 0 | 1 | 0 | 1 | 0 |
| No=xxxxx | 1 | 0 | 0 | 1 | 0 | 0 | 1 | 0 |
| | 0 | 1 | 0 | 0 | 1 | 0 | 0 | 1 |
| | 0 | 0 | 1 | 0 | 0 | 1 | 0 | 0 |
| ⋮ | ⋮ | | | | | | | |

TONE GENERATOR DEVICE FOR DRIVING LIGHT EMITTING ELEMENTS

BACKGROUND OF THE INVENTION

The present invention relates to a tone generator device having a function of driving light emitting elements, a portable (or mobile) phone using the tone generator device, and a method for driving the light emitting elements for such a tone generator device or portable phone. The present invention also relates to a portable phone having a function of displaying information of a caller (call originator) via light emitting elements in response to receipt of an incoming call, and a method for driving the light emitting elements for that purpose.

Heretofore, techniques have been developed for varying a light emission pattern of an LCD (Liquid Crystal Display) backlight in synchronism with an incoming-call signaling melody (also known as a ringer melody) of a portable phone; one example of such techniques is disclosed in Japanese Patent Application Laid-open Publication No. 2001-211237. With the techniques, users of portable phones can not only identify arrival of an incoming call visually as well as auditorily, but also enjoy viewing the light emission pattern.

However, the above techniques, in accordance with which a CPU (Central Processing Unit) detects a musical scale of a ringer melody to control the light emission of the LCD backlight, is disadvantageous in that great burdens are imposed on the CPU. The techniques are also unsatisfactory in that the display tends to be very monotonous, because the light emission pattern is only varied in synchronism with the detected musical scale of the ringer melody and the ringer melody and the light emission pattern correspond to each other on a one-to-one basis.

Further, when the portable phone has received an incoming call, it has been necessary to confirm the phone number or name of the caller displayed on the LCD display device, in order to identify the caller. More sophisticated technique has been known, for example, from Japanese Patent Application Laid-open Publication No. HEI-9-238178 or HEI-11-004282, which permits each caller to be identified auditorily. More specifically, ringer melodies and expected callers are registered in memory in association with each other, and when an incoming call has been received, one of the registered ringer melodies, corresponding to the caller, is sounded to allow the user to auditorily identify the caller.

However, such caller identification by the ringer melody is also disadvantageous in that it can not be used in a quiet environment where loud sounds should not be produced.

SUMMARY OF THE INVENTION

In view of the foregoing, it is a first object of the present invention to provide a tone generator device with a light-emitting-element driving function which can effectively reduce a burden on an external CPU and can make visual displays of various light emission patterns, a portable phone using such a tone generator device, and a method for driving the light emitting elements for such a tone generator or portable phone.

It is a second object of the present invention to provide a portable phone which permits identification of a caller without using a visual display by a liquid crystal display device and even in a quiet environment where loud sounds should not be produced, and a method for driving light emitting elements for such a portable phone.

According to a first aspect of the present invention, there is provided an improved tone generator device, which comprises: a sequencer section that sequentially reads out tone generating sequence data in accordance with a performance sequence and decodes tone generation control parameters from the read-out sequence data; a control register that sequentially writes therein the decoded tone generation control parameters; a tone generation section that generates tone signals on the basis of the tone generation control parameters written in the control register; a pattern register that stores pattern data representative of a time series of driven states to be taken by a plurality of light emitting elements; and a pattern register drive section that, on the basis of the tone generation control parameters written in the control register, performs control to sequentially output the pattern data stored in the pattern register.

According to the present invention arranged in the above-identified manner, the tone generator device outputs pattern data that instruct a time series (time-serial sequence) of driven states to be taken by the plurality of light emitting elements, so that the light emission (i.e., illumination/deillumination) of the plurality of light emitting elements, located outside the tone generator device, can be controlled appropriately in a manner associated with generated tones. Therefore, whenever necessary, the light emission of the plurality of light emitting elements, located outside the tone generator device, can be controlled in a desired pattern without imposing a burden on an external CPU. Thus, where the tone generator device of the present invention is incorporated in another device, such as a portable phone, light emission of light emitting elements provided on the other device can be controlled appropriately with no burden on the CPU of the other device. For example, the portable phone, employing the tone generator device constructed in accordance with the first aspect of the invention, may be arranged to receive an incoming call notification from a base station, issue a ring tone generation instruction for generating ring tones in response to the receipt of the incoming call notification and then, in response to the ring tone generation instruction, sequentially read out tone generating sequence data in accordance with a performance sequence. In this way, not only ring tones can be generated from the tone generation section in accordance with the performance sequence, but also the displaying states of the light emitting elements can be variously varied in synchronism with the generated ring tones.

According to a second aspect of the present invention, there is provided an improved portable phone, which comprises: a plurality of light emitting elements; a storage section that stores one or more sets of pattern data, each representing a time series of patterns each indicative of driven states to be taken by the plurality of light emitting elements, and one or more caller identification numbers in association with each other; a readout section that, when an incoming call notification has been received from a base station, reads out, from the storage section, one of the sets of pattern data that corresponds to the caller identification number of a caller of the incoming call; and a drive section that illuminates the plurality of light emitting elements in accordance with the pattern data read out by the readout section in correspondence with the caller identification number of the caller.

When the portable phone has received an incoming call notification from the base station, it can illuminate the plurality of light emitting elements (i.e., cause the light emitting elements to emit light) in accordance with pattern data read out in correspondence with the caller identification number of the caller of the incoming call. In this way, the user of the portable phone can readily confirm who is the caller (i.e., call originator), by looking at the light emission pattern of the light emitting elements. Thus, even in a quiet environment where loud sounds should not be produced, the user of the portable phone can readily confirm who is the caller. Also, there can be provided a novel portable phone that can give a light-emitting display, full of visual variety, in response to an incoming call.

According to still another aspect of the present invention, there is provided a portable phone, which comprises: a tone generation section that generates tone signals; a plurality of light emitting elements; a first storage section that stores one or more sets of first pattern data, each representing a time series of driven states to be taken by the plurality of light emitting elements, and one or more caller identification numbers in association with each other; a second storage section that stores one or more sets of second pattern data, each representing a time series of driven states to be taken by the plurality of light emitting elements, for driving the plurality of light emitting elements in synchronism with generation, by the tone generation section, of the tone signals; a selection section that selects either one of a caller-correspondent mode and a tone-synchronous mode in accordance with an instruction given by a user; and a drive section. When an incoming call notification has been received from a base station during a period when the caller-correspondent mode is selected by the selection section, the drive section reads out, from the first storage section, one of the sets of first pattern data that corresponds to the caller identification number of a caller of the incoming call and then illuminates the plurality of light emitting elements (i.e., causes the light emitting elements to emit light) in accordance with the read-out set of first pattern data. When an incoming call notification has been received from the base station during a period when the tone-synchronous mode is selected by the selection section, on the other hand, the drive section reads out, from the second storage section, one of the sets of second pattern data that corresponds to the caller identification number of a caller of the incoming call and then illuminates the plurality of light emitting elements in accordance with the read-out set of second pattern data.

By selecting either one of the caller-correspondent mode and tone-synchronous mode, the user can freely switch between a display mode for illuminating the light emitting diodes of the portable phone in a desired pattern in synchronism with ring tones and another display mode for illuminating the light emitting diodes in a desired pattern in association with the caller. As a result, there can be provided a novel portable phone that can give a light-emitting display, full of visual variety, in response to an incoming call.

The present invention may be constructed and implemented not only as the device invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE EMBODIMENTS

Figure 1:
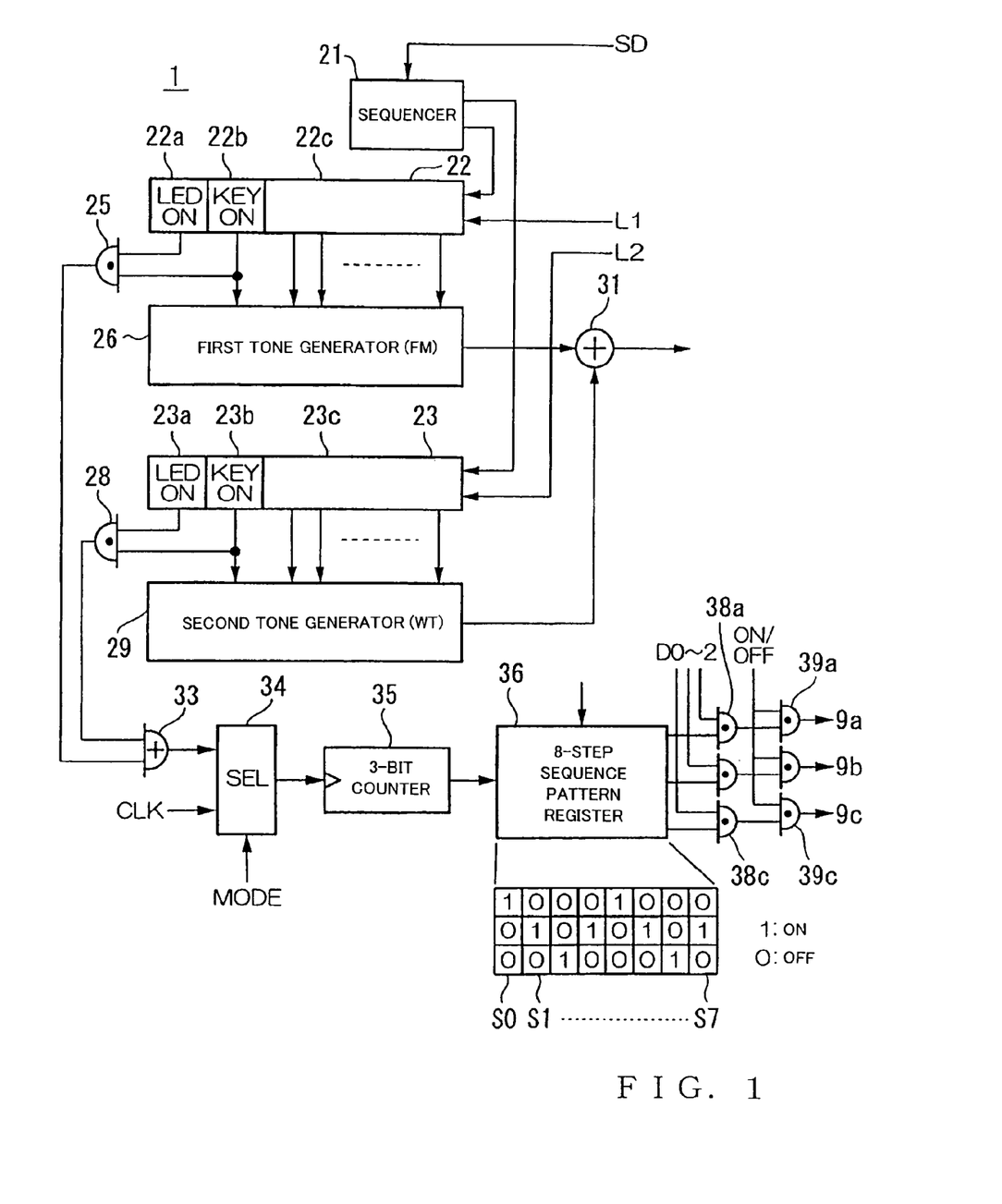
FIG. 1 is a block diagram showing a general setup of a tone generator device in accordance with an embodiment of the present invention.
Figure 2:
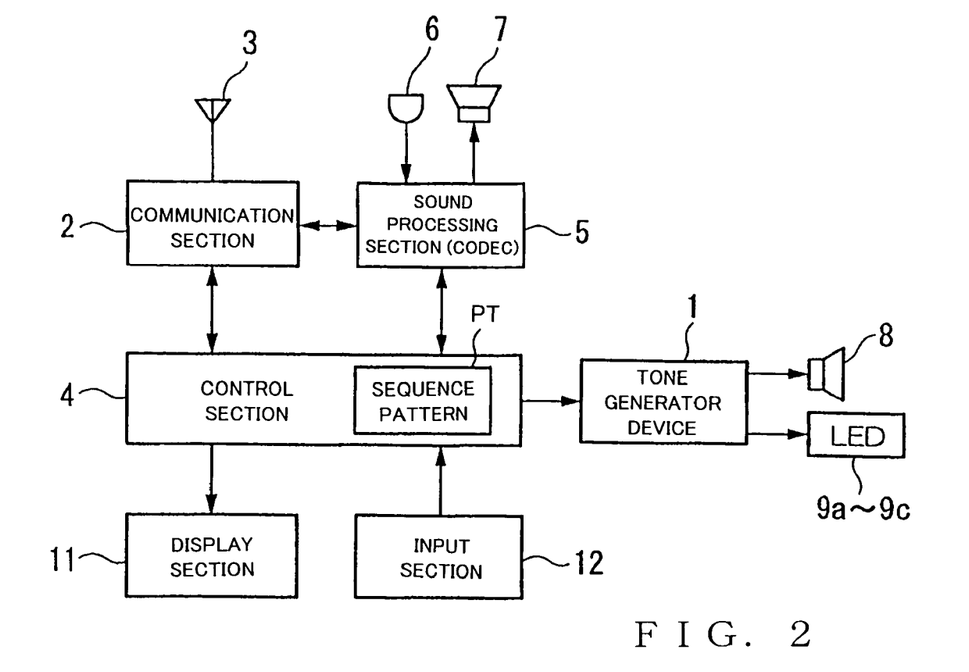
FIG. 2 is a block diagram showing a general hardware setup of a first embodiment of a portable phone using the tone generator device of FIG. 1.

FIG. 1 is a block diagram showing a general setup of a tone generator device 1 in accordance with an embodiment of the present invention, and FIG. 2 is a block diagram showing a general hardware setup of a first embodiment of a portable phone using the tone generator device 1 of FIG. 1. In FIG. 2, reference numeral 2 represents a communication section which transmits data on a carrier wave from an antenna 3 and decodes data, received via the antenna 3, to deliver the decoded data to the CPU 4 or sound processing section (CODEC) 5. The sound processing section 5 converts a voice/sound signal, given from a microphone 6, into digital data and compresses the converted digital data to supply the communication section 2 with the compressed data as data to be transmitted. Also, the sound processing section 5 converts tone data, supplied from the communication section 2, into an analog sound signal and outputs the analog sound signal to an ear speaker 7.

Figure 3:
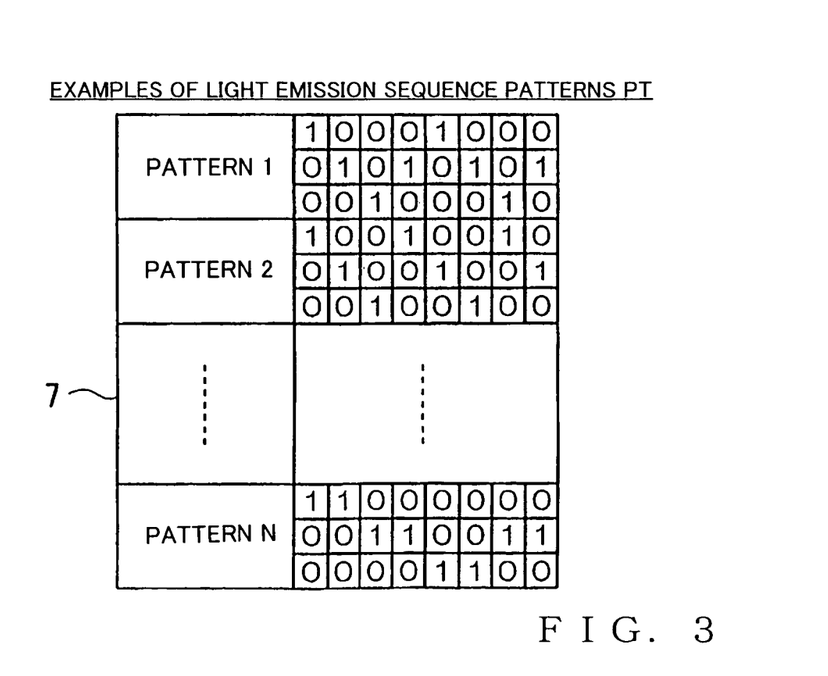
FIG. 3 is a diagram showing examples of light emission sequence patterns stored in a control section of FIG. 2.

The control section 4 shown in FIG. 2 includes a CPU for controlling various components and a semiconductor memory. In the memory, there are prestored programs to be used by the CPU, ringer melody performance sequence data for driving the tone generator device 1, and light emission sequence patterns PT for driving three LEDs (Light Emitting Diodes) 9a-9c provided on a case of the portable phone. FIG. 3 is a diagram illustratively showing N (i.e., one or a desired plurality of) light emission sequence patterns PT, and each of the sequence patterns PT comprises data of 3×8 bits.

The tone generator device 1 generates digital tone signals on the basis of sequence data supplied from the control section 4 and outputs the generated digital tone signals to a speaker 8 via a D/A converter (not shown), and the LEDs 9a-9c are driven on the basis of a light emission sequence pattern supplied from the control section 4, as will be later detailed. Display section 11 comprises an LCD (Liquid Crystal Display) and a display control circuit, and it displays data supplied from the control section 4. Input section 12 includes an operation section including an off-hook button, on-hook button, numeric keypad and various other keys, and an interface for supplying the control section 4 with outputs from the keys.

The following paragraphs detail the tone generator device 1 with reference to FIG. 1.

In FIG. 1, a sequencer 21 decodes performance sequence data SD for a ringer melody (i.e., ringer melody performance sequence data SD) supplied from the control section 4 of FIG. 2, to thereby generate various tone generation control parameters. For example, the sequencer 21 stores therein the ringer melody performance sequence data SD supplied from the control section 4 and sequentially reads out tone generation data, such as tone pitch data, tone volume data and tone color data, KEY-ON data and LED-ON data, included in the stored performance sequence data SD, in accordance with time data also included in the sequence data SD, and it sets the thus read-out data into control registers 22 and 23. In this case, the LED-ON data, KEY-ON data and tone generation data are written into slots 22a-22c and 23a-23c, respectively, of the control registers 22 and 23. The above-mentioned tone generation data and KEY-ON data constitute tone generation control parameters for use by the tone generator device 1 to generate tones. Note that the function of the sequencer 21 may be performed by the CPU within the control section 4, rather than by the tone generator device 1.

In the control register 22, into which the data are written by the above-mentioned sequencer 21, data L1 (one bit) output from the control section 4 is also written into the slot 22a. Namely, data writing to the slot 22a of the control section 4 can be performed not only by the sequencer 21 but also by the control section 4. Further, data (one bit) output from the slot 22a and data (one bit) output from the slot 22b are delivered to an AND 25 and to a first tone generator 26, and data (tone generation data of a plurality of bits) output from the other slot 22c is delivered to the first tone generator 26.

Similarly, in the control register 23, into which the data are written by the above-mentioned sequencer 21, data L2 (one bit) output from the control section 4 is also written into the slot 23a. Namely, data writing to the slot 23a of the control section 4 can be performed not only by the sequencer 21 but also by the control section 4. Further, data (one bit) output from the slot 23a and data (one bit) output from the slot 23b are delivered to an AND 28 and to a second tone generator 29, and data (tone generation data of a plurality of bits) output from the other slot 23c is delivered to the second tone generator 29. In this case, the "slots" are each an area within the register 22 or 23.

The first tone generator 26 generates digital tone signals on the basis of the KEY-ON data and tone generation data supplied from the control register 22 and in accordance with an FM (Frequency Modulation) scheme and outputs the generated digital tone signals to an adder circuit 31. The second tone generator 29 generates digital tone signals on the basis of the KEY-ON data and tone generation data supplied from the control register 23 and in accordance with a WT (waveform table) scheme and outputs the generated digital tone signals to the adder circuit 31. The adder circuit 31 adds together the output data from the tone generators 26 and 29, and then outputs the added result to the speaker 8 via the D/A converter (not shown).

OR gate 33 logically ORs the outputs from the AND gates 25 and 28 and outputs the ORed result to a first input terminal of a selector 34. When a mode signal MODE output from the control section 4 is of a value "1", the selector 34 selects the output from the OR gate 33 having been supplied to its first input terminal, while, when the mode signal MODE is of a value "0", the selector 34 selects a clock pulse CLK having been input to its second input terminal. The selected result is output from the selector 34 to a counter 35 which is in the form of a 3-bit counter. The counter 35 counts each output pulse of the selector 34 in response to the rising edge of the pulse and supplies a counted value to a sequence pattern register 36 by sequentially accessing the sequence pattern register 36.

The sequence pattern register 36 is a register (in other words, light emission sequence pattern memory or table) into which a (3×8)-bit sequence pattern is written by the control section 4. Specifically; a selected one of the light-emission sequence patterns is read out from the memory of the control section 4 and transferred to the sequence pattern register 36 for storage therein, and the sequence pattern register 36 outputs 3-bit light emission pattern data in response to the output from the counter 35. Namely, the sequence pattern register 36 outputs data of a slot S0 when the count output from the counter 35 is "0", and outputs data of a slot S1 when the count output from the counter 35 is "1". Similarly, when the count output from the counter 35 is any one of "2" to "7", the sequence pattern register 36 outputs data of any one of slot S2 to S7 corresponding to the count. Namely, the sequence pattern register 36 has the plurality of slots (or stages), in each of which a time series of driven states (i.e., driving patterns) to be taken by the plurality of light emitting elements is stored.

Output data from the sequence pattern register 36 are supplied to AND gates 38a-38c, which are ON/OFF-controlled in accordance with control data D0-D2 output from the control section 4. Outputs from the AND gates 38a-38c are supplied to next-stage AND gates 39a-39c, which are ON/OFF-controlled in accordance control data ON/OFF output from the control section 4. Outputs from the AND gates 39a-39c are supplied to the three LEDs 9a-9c provided on the case of the portable phone shown in FIG. 2.

The following paragraphs describe operation or behavior of the tone generator device 1 constructed in the above-described manner.

Once a ringer melody reproduction start instruction is given from the control section 4 to the sequencer 21, the performance sequence data of a ringer melody stored in the sequencer 21 are sequentially read out and decoded, so that the tone generation data, KEY-ON data and LED-ON data are set into the control registers 22 and 23. The data thus-set in the slots 22b and 22c of the control register 22 and the data thus-set in the slots 23b and 23c of the control register 23 are output to the first and second tone generators 26 and 29, respectively, so that the first and second tone generators 26 and 29 generate and output digital tone signals to the adder circuit 31. The adder circuit 31 adds together the outputs of the first and second tone generators 26 and 29 and supplies the added result to the speaker 8. In this way, the ringer melody is audibly produced from the speaker 8.

Figure 4A:
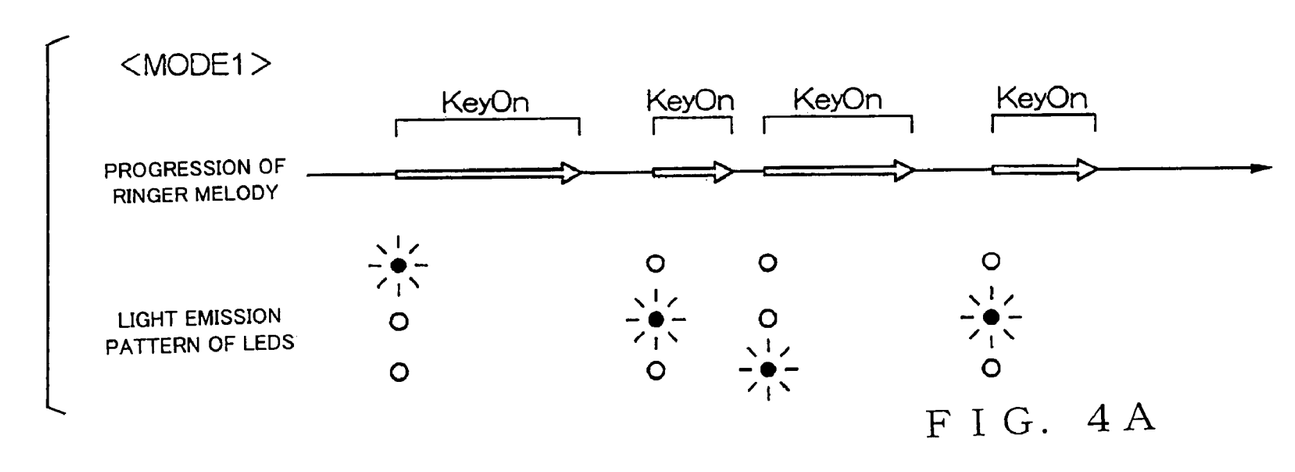
FIGS. 4A and 4B are diagrams explanatory of respective driving timing of LEDs shown in FIG. 2.

Let's now assume that, in the performance sequence data of the designated ringer melody, "1" is preset as the LED-ON data of the slot 22a of the control register 22 and "0" is preset as the LED-ON data of the slot 23a of the control register 23. Let it also be assumed that "1" is preset as the mode signal MODE, control data D0-D2 and control data ON/OFF. In this case, each time the KEY-ON data of the slot 22b of the control register 22 changes to "1", the output of the AND gate 25 turns to "1", which is supplied to the counter 35 via the OR gate 33 and the selector 34 where the first input terminal is currently selected. Thus, each time the KEY-ON data changes to "1", the counter 35 counts up and the sequence pattern register 36 is accessed to sequentially output 3-bit pattern data, so that the output 3-bit pattern data are supplied to the LEDs 9a-9c via the AND gates 38a-38c and 39a-39c. In this way, the illumination (driven) states of the LEDs 9a-9c are controlled, at the KEY-ON timing of the first tone generator 26, in accordance with the LED driving pattern stored in the sequence pattern register 36. FIG. 4A illustratively shows relationship between the KEY-ON data and the illumination states of the LEDs 9a-9c in this case. Specifically, FIG. 4A illustrates variation in the illumination states of the LEDs 9a-9c which are based on the pattern illustratively shown in a lower end section of FIG. 1.

Further, if, in the performance sequence data of the ringer melody, "0" is preset as the LED-ON data of the slot 22a of the control register 22 and "1" is preset as the LED-ON data of the slot 23a of the control register 23, then the illumination states of the LEDs 9a-9c are controlled at the KEY-ON timing of the second tone generator 29.

Further, when "1" has been output as the control data L1 from the control section 4, "1" is set into the slot 22a of the control register 22 irrespective of the sequence data. When "1" has been output as the control data L2 from the control section 4, "1" is set into the slot 23a of the control register 23 irrespective of the sequence data.

In this case, the sequence pattern data are output from the sequence pattern register 36 in accordance with an OR between the KEY-ON data of the slot 22b in the control register 22 and the KEY-ON data of the slot 23b in the control register 23, and thus the illumination states of the LEDs 9a-9c are controlled in accordance with relationship between the KEY-ON timing of the first tone generator 26 and the KEY-ON timing of the second tone generator 29.

Figure 4B:
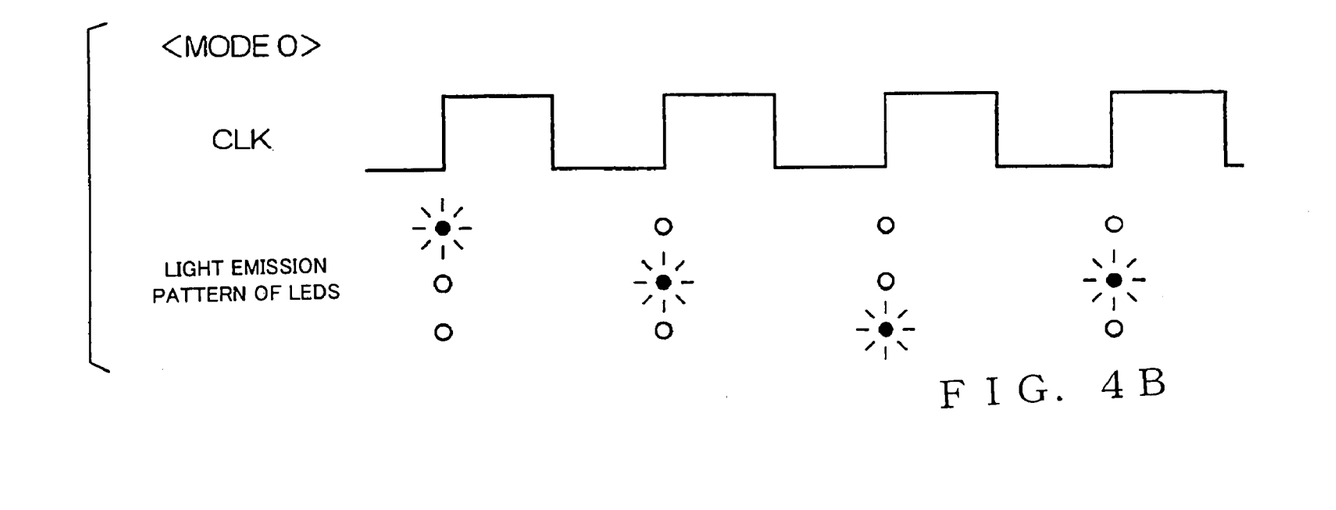

If "0" has been set as the mode signal MODE, the clock pulses CLK are supplied via the selector 34 to the counter 35. Thus, the sequence pattern data are read out in response to the clock pulses CLK and supplied to the LEDs 9a-9c. FIG. 4B illustratively shows relationship between the clock pulses CLK and the illumination states of the LEDs 9a-9c in the above-mentioned case.

The control data D0-D2 are intended to control the ON/OFF states of the LEDs 9a-9c independently of each other. For example, if "1 1 0" are set as the control data D0-D2, then the LEDs 9a and 9b are turned on or driven, while the LED 9c is turned off.

The control data ON/OFF is intended to ON/OFF-control all the LEDs 9a-9c in a collective manner.

Figure 6:
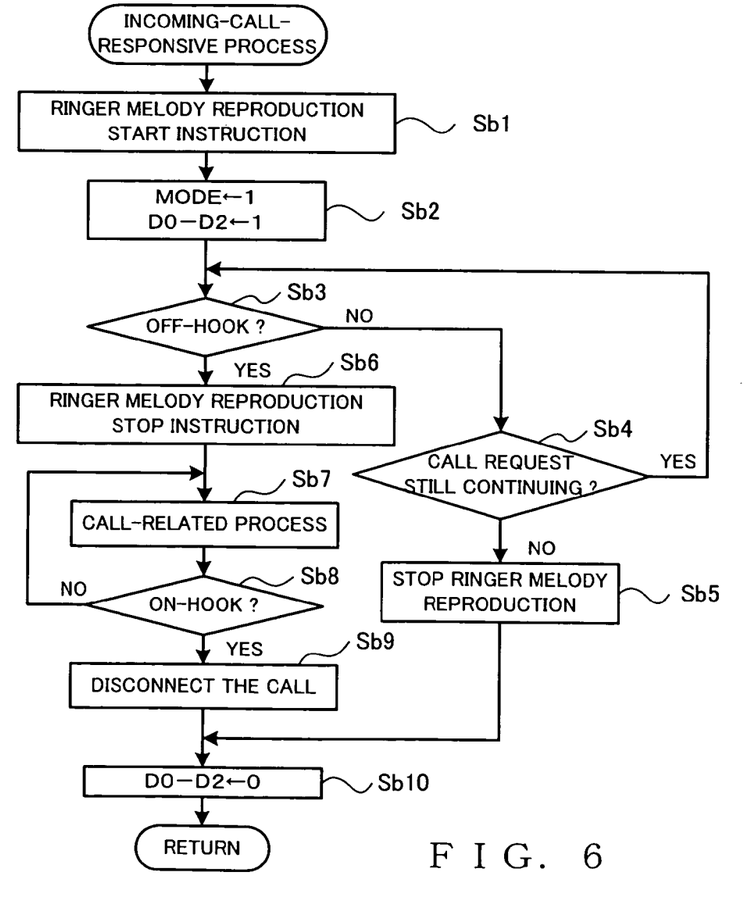
FIG. 6 is a flow chart explanatory of an incoming-call-responsive process performed by the first embodiment of the portable phone of FIG. 2 in response to receipt of an incoming call.
Figure 7:
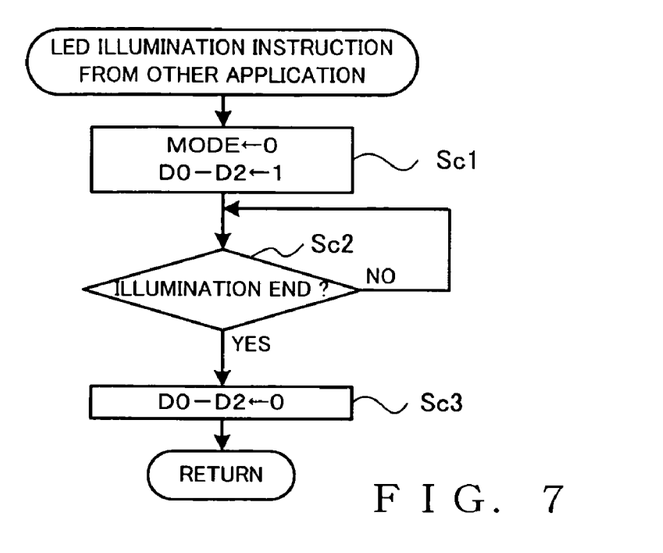
FIG. 7 is a flow chart explanatory of an LED drive process based on other application software provided in the portable phone of FIG. 2.

Next, behavior of the first embodiment of the portable phone shown in FIG. 2 will be described with reference to FIGS. 5 to 7.

Figure 5:
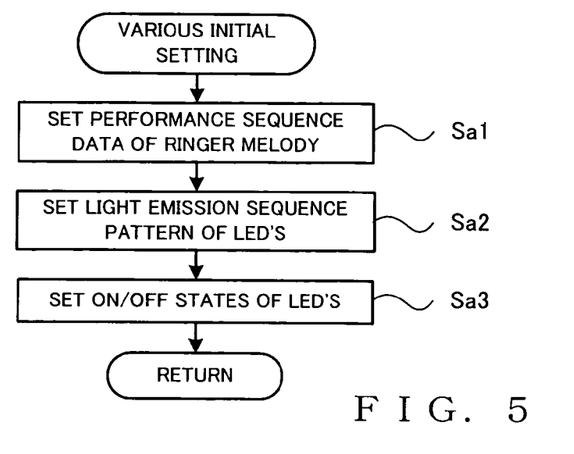
FIG. 5 is a flow chart explanatory of an initial setting process performed by the first embodiment of the portable phone of FIG. 2 upon startup of the phone.

(1) Initial Setting Process (Flow Chart of FIG. 5):

Upon powering-on of the portable phone, the control section 4 first sets a set of performance sequence data of a ringer melody into the sequencer 21 of the tone generator device 1 (step Sa1 of FIG. 5), and then sets a corresponding sequence pattern, intended to control the illumination states of the LEDs 9a-9c, into the sequence pattern register 36 (step Sa2 of FIG. 5). Note that the ringer melody performance sequence data set and illumination-state controlling light-emission sequence pattern have been selected in advance by the user. Namely, the ringer melody performance sequence data set is one selected in advance by the user from among one or more sets of performance sequence data sets, and the illumination-state controlling light-emission sequence pattern is one selected in advance by the user from among one or more illumination-state controlling light-emission sequence patterns.

Then, the control section 4 displays, on the display section 11, a screen for the user to select an LED-ON or LED-OFF mode and sets the selected LED-ON or LED-OFF mode in accordance with the selection by the user (step Sa3). Namely, if the user has selected the LED-ON mode, the control section 4 outputs "1" as the control data ON/OFF to the AND gates 39a-39c (FIG. 1), but, if the user has selected the LED-OFF mode, the control section 4 outputs "0" as the control data ON/OFF to the AND gates 39a-39c (FIG. 1).

(2) Incoming-Call-Responsive Process (Flow Chart of FIG. 6):

Once an external incoming call is received, the communication section 2 outputs an incoming call notification to the control section 4. In response to the incoming call notification, the control section 4 gives a ringer melody reproduction start instruction to the sequencer 21 of the tone generator device 1 (step Sb1) and outputs "1" as the mode signal MODE and "1 1 1" as the control data D0-D2 (step Sb2). Then, the sequence data are sequentially supplied from the control section 4 to the sequencer 21 of the tone generator device 1, so that the tone generator device 1 generates tone signals of the ringer melody. The thus-generated tone signals are supplied to the speaker 8 and audibly produced or sounded through the speaker 8. Also, the selected light emission pattern is written from the control section 4 into the sequence pattern register 36 and supplied from the sequence pattern register 36 at the KEY-ON timing of the first or second tone generator 26 or 29. Thus, the LEDs 9a-9c are driven on the basis of the selected light emission pattern.

Next, a determination is made, at step Sb3, as to whether the off-hook button has been turned on or depressed. With a "NO" determination at step Sb3, it is further determined at step Sb4 whether the call request of the calling party (caller or call originator) is still continuing. If a "YES" determination has been made at step Sb4, the control section 4 reverts to step Sb3, so that the determinations of steps Sb3 and Sb4 are repeated. Meantime, tone signals of the ringer melody are generated by the tone generator device 1, and illumination control is performed on the LEDs 9a-9c. While the determinations of steps Sb3 and Sb4 are being repeated, reproduction of ring tones represented by the performance sequence data is repeated, and illumination/deillumination of the LEDs 9a-9c is repeated in accordance with the 8-step illumination/deillumination pattern set in the sequence pattern register 36.

Then, once a "NO" determination is made at step Sb4, the control section 4 gives a ringer melody reproduction stop instruction to the sequencer 21 (step Sb5). In response to the ringer melody reproduction stop instruction, the sequencer 21 clears the control registers 22 and 23, so that the reproduction of the ringer melody is terminated and simultaneously the patterned driving of the LEDs 9a-9c is brought to an end.

Once the user, having listened to the ringer melody, depresses the off-hook button, a "YES" determination is made at step Sb3, and the control section 4 proceeds to step Sb6. At step Sb6, the control section 4 gives a ringer melody reproduction stop instruction to the sequencer 21. Thus, the reproduction of the ringer melody is terminated and simultaneously the patterned driving of the LEDs 9a-9c is brought to an end. Then, the control section 4 carries out a call-related process at step Sb7, and determines at step Sb8 whether the on-hook button has been turned on. With a "NO" determination at step Sb8, the control section 4 reverts to step Sb7, and then the operations of steps Sb7 and Sb8 are repeated until the on-hook button is turned on.

Once the user turns on the on-hook button, a "YES" determination is made at step Sb8, and the control section 4 disconnect the call (step Sb9). The, the control section 4 sets the control data D0-D2 at "0 0 0" (step Sb10), so that the LEDs 9a-9c are deilluminated or turned off.

(3) LED Illumination Control by Other Application Software (FIG. 7):

The LEDs 9a-9b can also be used for other applications, such as games and time information, affixed to the portable phone. In this case, after the control section 4 decodes an LED illumination instruction for selected other application software, it first set the mode signal MODE to "0" and the control signals D0-D2 to "1 1 1" (step Sc1). Thus, the clock pulses CLK are supplied via the selector 34 to the counter 35, so that the pattern data are sequentially read out from the sequence pattern register 36 in accordance with the outputs from the counter 35 and supplied to the LEDs 9a-9c. In this way, the LEDs 9a-9c are driven in response to the clock pulses CLK on the basis of the sequence pattern. After that, the LEDs 9a-9b are driven until an LED illumination end instruction generated by the other application software is decoded by the control section 4 (Sc2). After the LED illumination end instruction has been decoded, the control data D0-D2 are set to "0 0 0" (step Sc3), so that the LEDs 9a-9c are turned off.

Figure 8:
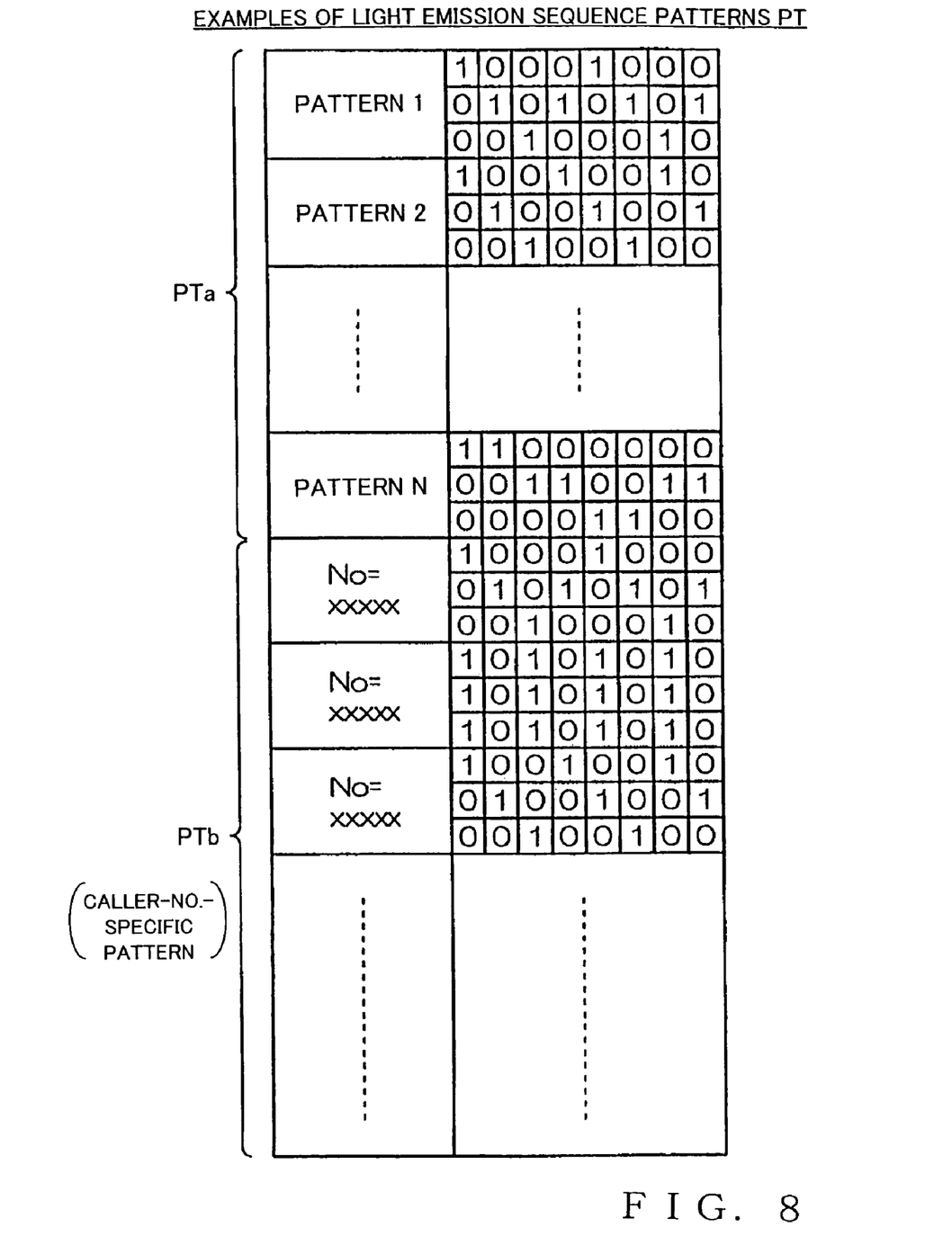
FIG. 8 is a diagram showing examples of light emission sequence patterns stored in a control section of a second embodiment of the portable phone.
Figure 9:
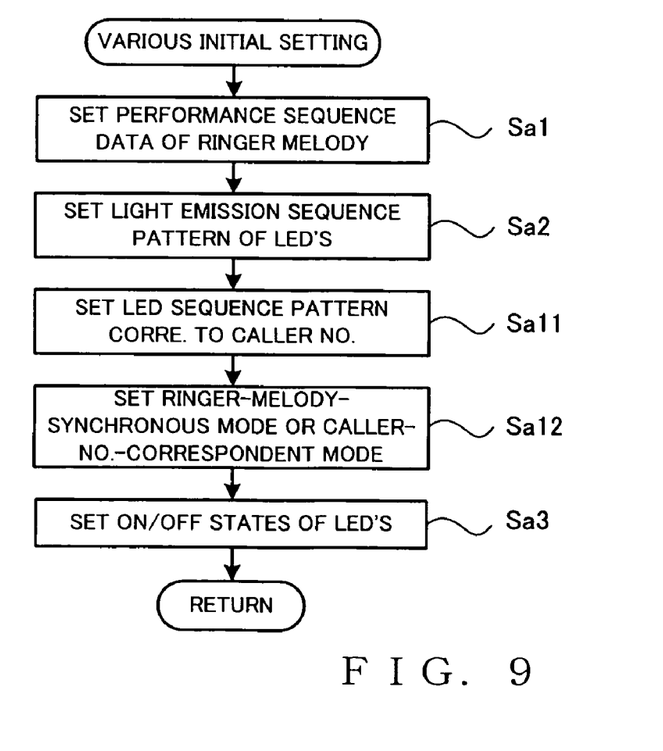
FIG. 9 is a flow chart showing an initial setting process performed in the second embodiment on startup of the phone.
Figure 10:
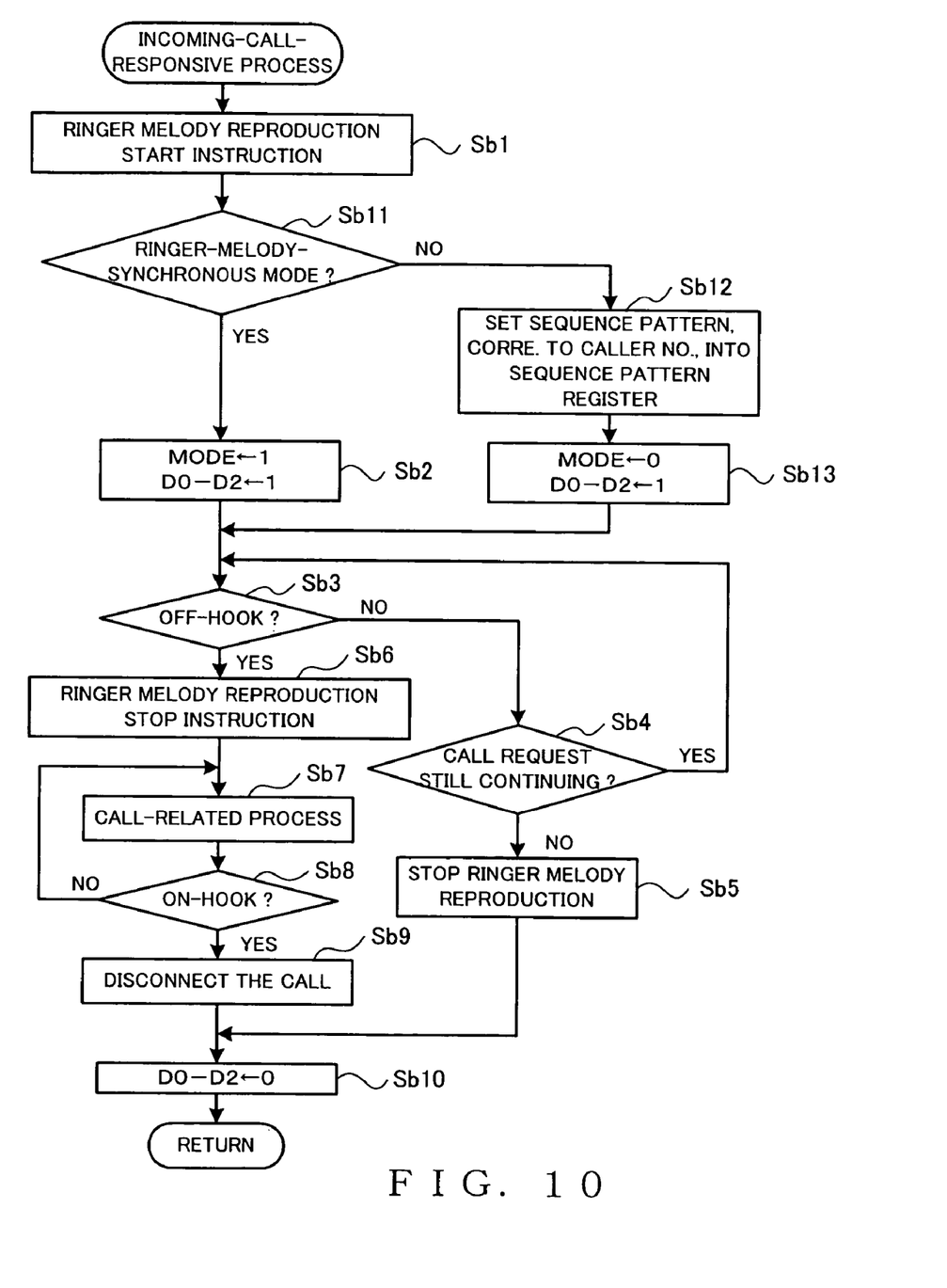
FIG. 10 is a flow chart showing an incoming-call-responsive process performed by the control section in the second embodiment.

The following paragraphs describe a second embodiment of the portable phone, with reference to FIGS. 8-10.

The second embodiment of the portable phone has a hardware setup similar to that of the first embodiment shown in FIG. 2, and it is assumed here that the second embodiment uses a tone generator device 1 similar to that shown in FIG. 1. FIG. 8 is a diagram showing various examples of light emission sequence patterns PT stored in the memory of the control section 4 (see FIG. 2) in the second embodiment of the portable phone. The light emission sequence patterns PT of FIG. 8 include a first group of N light emission sequence patterns ("pattern 1" to "pattern N") PT (first light emission sequence pattern group PTa) similar to those of FIG. 3, and a second group of one or more light emission sequence patterns unique or specific to one or more caller identification numbers (e.g., phone numbers) (second light emission sequence pattern group PTb). With these caller-number-specific light emission sequence patterns (second light emission sequence pattern group PTb), the second embodiment of the portable phone performs various operations different from those performed by the above-described first embodiment, as will be set forth below.

FIG. 9 is a flow chart showing an example of an initial setting process performed by the control section 4 in the second embodiment on startup of the portable phone. Steps Sa1, Sa2 and Sa3 of FIG. 9 are directed to operations similar to those of the same step numbers shown in FIG. 5, and thus these steps will not be described here to avoid unnecessary duplication. Steps Sa11 and Sa12 are directed to operations unique to the second embodiment. At step Sa11, one or more caller identification numbers (e.g., phone numbers) and one or more light emission sequence patterns (those of the second group PTh of FIG. 8) are stored, in the inner memory of the control section 4, in association with each other. In this case, the light emission sequence patterns of the second group PTh may be set either by the user operating predetermined keys on the input section 12, or by the user selecting desired one or ones of light emission sequence patterns prepared in advance. At next step Sa12, a mode for using the light emission sequence patterns is set to either one of two modes: a ringer-melody-synchronous mode (for the first light emission sequence pattern group PTa); and a caller-number-correspondent mode (for the second light emission sequence pattern group PTb). In this case, the mode for using the light emission sequence patterns may be set, for example, by the user selecting one of the above-mentioned two modes through key operation on the input section 12 with reference to a mode selecting screen displayed on the display section 11.

FIG. 10 is a flow chart showing an example of an incoming-call-responsive process performed by the control section 4 in the second embodiment in response receipt of an incoming call. Steps Sb1-Sb10 of FIG. 10 are directed to operations similar to those of the same step numbers shown in FIG. 6, and thus these steps will not be described here to avoid unnecessary duplication. Steps Sb11, Sb12 and Sb13 are directed to operations unique to the second embodiment. Step Sb11 is inserted between the above-described steps Sb1 and Sb2. With a "YES" determination at step Sb11, the control section 4 moves on to step Sb2, but, with a "NO" determination at step Sb11, the control section 4 goes to step Sb3 by way of steps Sb12 and Sb13.

At step Sb11, a determination is made as to whether the ringer-melody synchronization mode (light emission sequence pattern group PTa) is currently set. With a "YES" determination, the control section 4 goes to step Sb2 so as to perform operations at and after step Sb2 similar to those shown in FIG. 6. With a "NO" determination, i.e. if the caller-number-correspondent mode (light emission sequence pattern group PTb) is currently set, the control section 4 branches to step Sb12.

At step Sb12, the control section 4 reads out, from the memory, a light emission sequence pattern (PTb of FIG. 8) corresponding to the unique identification number of the caller, and sets the read-out light emission sequence pattern into the sequence pattern register 36 (see FIG. 1). At next step Sb13, the control section 4 supplies the selector (FIG. 1) with "0" as the mode signal MODE, and then supplies the AND gates 38a-38c with "1 1 1" as the control data D0-D2.

If the route of the above-described steps Sb1, Sb11, Sb12 and Sb13 is taken, tone signals of the ringer melody are generated and output to the speaker 8, so that finger melody tones (i.e., ring tones) are audibly produced via the speaker 8. Further, the clock pulses CLK are supplied via the selector 34 to the counter 35, which counts up the respective rising edges of the clock pulses CLK. In response to successive outputs from the counter 35, the light emission sequence pattern data are sequentially read out from the sequence pattern register 36 to be supplied to the LEDs 9a-9c via the AND gates 38a-38c and 39a-39c. Thus, the LEDs 9a-9c are driven in accordance with the light emission sequence pattern corresponding to the caller identification number. After that, the control section 4 carries out the above-described operations of steps Sb3-Sbl0.

Namely, when the caller-number-correspondent mode has been set, the LEDs 9a-9c are driven in accordance with the light emission sequence pattern corresponding to the caller identification number, so that the user of the portable phone can identify the caller on the basis of the illumination state of the LEDs 9a-9c.

When the ringer-melody-synchronous mode (i.e., tone-synchronous mode) has been set, the LEDs 9a-9c are driven in synchronism with the ringer melody tones and in accordance with a light emission sequence pattern stored in the sequence pattern register 36. In this manner, each incoming call to the portable phone can be signaled to the user with enhanced visual variety.

In the above-described embodiments, the three monochromatic LEDs 9a-9c are driven via the tone generator device 1 in accordance with a light emission sequence pattern. In an alternative, a display element may be constructed by providing red-color, blue-color and green-color LEDs within a capsule in close proximity to one another and may be driven in accordance with a light emission sequence pattern stored in the sequence pattern register 36. In this case, the display element can be illuminated in eight different colors on the basis of the light emission sequence pattern.

Further, the embodiments have been described as including only two (i.e., first and second tone generators). However, in an actual tone generator device constructed in accordance with the present invention, there are provided a multiplicity of tone generators (e.g., 64 tone generators). Furthermore, the counter 35 may be driven on the basis of key-on signals of a tone generator for a particular performance part, e.g., tone generator for generating rhythm tones, Furthermore, the above-described second embodiment is constructed to vary the caller-number-correspondent pattern in response to the clock pulses CLK. In an alternative, the mode signal MODE may be set at "1" even in the caller-number-correspondent mode so that the caller-number-correspondent pattern is varied in synchronism with the ringer melody.

Furthermore, when the user has set a caller-number-correspondent pattern in the second embodiment, the LEDs 9a-9c may be driven by way of trial in accordance with the set pattern, so as to confirm a visual display by the LEDs 9a-9c.

What is claimed is:

1. A tone generator device comprising:
   a sequencer section that sequentially reads out tone generating sequence data in accordance with a performance sequence and decodes tone generation control parameters from the read-out sequence data;
   a control register that sequentially writes therein the tone generation control parameters decoded by said sequencer section;
   a tone generation section that generates tone signals on the basis of the tone generation control parameters written in said control register;
   a pattern register that stores pattern data representative of a time series of driven states to be taken by a plurality of light emitting elements; and
   a pattern register drive section that, on the basis of the tone generation control parameters written in said control register, performs control to sequentially output the pattern data stored in said pattern register.

2. A tone generator device as claimed in claim 1 wherein said pattern register drive section is capable of performing said control to sequentially output the pattern data in a selected one of a first mode where the tone generation control parameters written in said control register are used and a second mode where given clock pulses are used, and
   wherein, in said first mode, said pattern register drive section sequentially outputs the pattern data, stored in said pattern register, on the basis of the tone generation control parameters written in said control register, while, in said second mode, said pattern register drive section sequentially outputs the pattern data, stored in said pattern register, on the basis of the clock pulses.

3. A tone generator device as claimed in claim 1 which is incorporated in a portable phone, and
   wherein, when the portable phone has received an incoming call, said sequencer section starts reading out the sequence data on the basis of an instruction given by a control section within the portable phone.

4. A tone generator device as claimed in claim 1 which is incorporated in a portable phone, and
   wherein said plurality of light emitting elements are light emitting diodes provided on said portable phone, and
   the pattern data stored in said pattern register comprise a series of data instructing time-serial illumination states to be taken by said plurality of light emitting elements.

5. A tone generator device as claimed in claim 1 wherein a set of pattern data selected by a user from among a plurality of sets of pattern data is stored in said pattern register, so that the pattern data stored in said pattern register are rewritable through selection operation by a user.

6. A tone generator device as claimed in claim 1 which includes a plurality of the tone generation sections and is capable of setting, for each of the tone generation sections, whether or not said light emitting elements are to be driven on the basis of the tone generation control parameters used in said tone generation section, and
   wherein said pattern register drive section sequentially outputs the pattern data, stored in said pattern register, on the basis of the tone generation control parameters corresponding to any one of the tone generation sections for which setting has been made such that said light emitting elements are to be driven on the basis of the tone generation control parameters used in said tone generation section.

7. A tone generator device as claimed in claim 1 which includes a plurality of the tone generation sections, and
   wherein a plurality of the control registers are provided in corresponding relation to said plurality of the tone generation sections, and
   said pattern register drive section sequentially outputs the pattern data, stored in said pattern register, on the basis of the tone generation control parameters written in one or more of said control registers corresponding to any one or more of said plurality of the tone generation sections.

8. A tone generator device as claimed in claim 1 wherein said pattern register drive section sequentially outputs the pattern data, stored in said pattern register, on the basis of a predetermined type of tone generation control parameter included in the tone generation control parameters written in said control register.

9. A tone generator device as claimed in claim 8 wherein said predetermined type of tone generation control parameter is a parameter instructing a start of tone generation, and said pattern register drive section sequentially outputs the pattern data, stored in said pattern register, in synchronism with a start of tone generation by said tone generation section.

10. A method for driving a plurality of light emitting elements in response to tone generation, which comprises:
    a step of sequentially reading out tone generating sequence data in accordance with a performance sequence and decoding tone generation control parameters from the read-out sequence data;
    a step of sequentially writing the decoded tone generation control parameters into a control register;
    a step of generating tone signals on the basis of the tone generation control parameters written in said control register; and
    a step of performing control to sequentially output, on the basis of the tone generation control parameters written in said control register, pattern data from a pattern register that stores pattern data representing a time series of driven states to be taken by said plurality of light emitting elements.

11. A computer-readable medium for storing a program for causing a processor to perform a method for driving a plurality of light emitting elements in response to tone generation, said method comprising:

a step of sequentially reading out tone generating sequence data in accordance with a performance sequence and decoding tone generation control parameters from the read-out sequence data;

a step of sequentially writing the decoded tone generation control parameters into a control register;

a step of generating tone signals on the basis of the tone generation control parameters written in said control register; and a step of performing control to sequentially output, on the basis of the tone generation control parameters written in said control register, pattern data from a pattern register that stores pattern data representing a time series of driven states to be taken by said plurality of light emitting elements.

* * * * *